United States Patent Office 3,228,950
Patented Jan. 11, 1966

3,228,950
PROCESS FOR THE PRODUCTION OF NEW PICOLINIC ACID DERIVATIVES
Ernst F. Renk, Im Langen Loh 190, Basel, Switzerland, and Niels Clauson-Kaas, Rugmarken 28, Farum, Denmark
No Drawing. Filed Nov. 4, 1963, Ser. No. 322,000
Claims priority, application Switzerland, Nov. 9, 1962, 13,166/62
5 Claims. (Cl. 260—295)

The present invention relates to a new process for the production of picolinic acid derivatives as well as the compounds obtainable according to this process, which are especially useful as intermediates for medicaments.

According to a first aspect of the invention the novel 3-hydroxy-N-nitro-picolinamide, of the formula

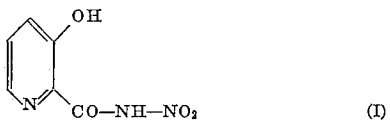

(I)

is produced by treating the 3-hydroxy-picolinamide with a nitric acid-sulfuric acid mixture at a temperature of not higher than about 25° C.

This is unexpected, for, whereas the nitration of the arylsulfonic acid amides, which are unsubstituted in the amide group, and of the carbonic acid amides such as ureas and urethanes, is a known reaction, only the nitration of N-substituted amides has been successfully performed in the series of the carboxylic acid amides (see W. E. Bachmann et al., J. Am. Chem. Soc. 72, 3132 [1950] and E. A. White et al., J. Am. Chem. Soc. 83 1191 [1961]).

The only known carboxylic acid-N-nitroamides not having further N-substituents, i.e. o-methoxy-carbonyl-N-nitro-benzamide, β-methoxycarbonyl-N-nitro-propionamide (see H. Kaufman and A. Burger, J. Org. Chem. 19, 1663 [1954]) and o-ethoxysulfonyl-N-nitro-benzamide (see J. Runge und W. Treibs, J. Pr. Chem. 286, 223 [1962] were obtained by alcoholyzing the corresponding N-nitro-imides, namely from N-nitro-phthalimide, -succinimide and -o-sulfobenzoic acid imide resp., and not by any method of direct nitration.

It is all the more surprising that 3-hydroxy-N-nitro-picolinamide can be produced by the simple easily controlled process according to the invention, especially in view of the fact that, when according to a frequently used nitration method, nitric acid in acetic anhydride (see W. E. Bechmann et al., loc. cit.) is caused to react with 3-hydroxy-picolinamide, a violent reaction occurs which is difficult to control.

In order to perform the above-mentioned step of the reaction sequence according to the invention, 3-hydroxy-picolinamide is dissolved in concentrated sulfuric acid and a mixture of fuming nitric acid and sulfuric acid is added drop by drop while stirring, and, at the same time, sufficient cooling to prevent the temperature of the reaction mixture from rising above 25° C. The reaction is allowed to continue for not longer than 5 hours, after which period of time the N-nitro-amide is precipitated, for example, by decomposing the reaction mixture with ice, and the N-nitro-amide is thus ready for direct, further use. The nitration reaction can also be performed at a temperature below 25° C., for example between —5° C. and 0° C.

While nitramides are usually highly unstable substances and hydrolyze easily, the compound of Formula I is surprisingly completely stable under normal conditions and is, especially, crystallizable from water.

According to a further aspect of the invention, picolinic acid derivatives of the general formula

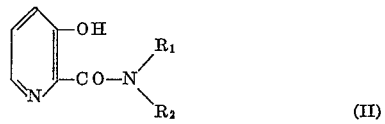

(II)

wherein $R_1$ represents hydrogen, a lower alkyl radical or a lower alkylene radical which forms a ring with $R_2$ and the adjacent nitrogen atom, and $R_2$ represents a monovalent aliphatic or cycloaliphatic radical with at most 12 carbon atoms, which may also contain halogen, oxygen atoms in the form of hydroxyl, ether or carbalkoxy groups, sulfur atoms in the form of alkylthio groups, or nitrogen atoms in the form of nitrile, amide or amino groups, or a phenyl, phenylalkyl, phenoxyalkyl, phenylalkenyl, heterocyclyl or heterocycylalkyl radical with at most 12 carbon atoms, whereby the aromatic homo- and hetero-rings may be substituted, if desired, by at most 3 substituents from the series of alkyl groups, alkoxy groups, halogen atoms, trifluoromethyl groups, hydroxyl groups, mercapto groups, nitro groups and/or amino groups, or finally it represents an N-alkyl-N-phenyl-carbamoylalkyl or a piperidinocarbonylalkyl group with in all at most 12 carbon atoms, are produced by reacting the 3-hydroxy-N-nitro-picolinamide (Formula I), resulting from the process step, described hereinbefore under the first aspect of this invention, with an amine of the general formula

(III)

in which $R_1$ and $R_2$ have the meaning given above, which reaction is carried out in various organic solvents, e.g. in ethanol or dimethylformamide, or in an excess of the amine to be reacted. Reaction begins at room temperature or at a higher temperature up to 150° C., depending on the amine to be reacted; however, reaction temperatures of above 150° should be avoided in order to prevent decomposition of the nitroamide. Self-heating of the mixture resulting from the exothermic salt formation of the N-nitro-amide reacting as acid with the amine, can be observed before the reaction starts even at low temperatures so that, in the most favourable case, an initial temperature of 0° C. for the reaction components is sufficient for the reaction to take its course.

The reaction of 3-hydroxy-N-nitro-picolinamide with amines of the general formula III is accompanied by the development of gaseous nitrous oxide. The beginning and end of the reaction are, therefore, easily determinable.

N-alkyl- and the like substituted carboxylic acid N-nitroamides, e.g. those of acetic and oxalic acid have been split by means of ammonia into carboxylic acid amide and N-nitro-amines for the purpose of preparing the latter substances (see, e.g. W. Bachmann et al., loc. cit.). It was, therefore, particularly unexpected that 3-hydroxy-N-nitro-picolinamide which is produced according to the invention and which is not further substituted in the amide group, would react with primary and secondary amines with formation of the picolinamides of Formula II and nitrous oxide.

The compounds produced according to the invention of the general Formula II are valuable intermediates. Especially, those compounds having a hydrogen atom as $R_1$ and wherein $R_2$ is alkyl having maximally 12 carbon atoms, alkenyl with 3 to 4 carbon atoms, propargyl, cycloalkyl, carbethoxymethyl, β-hydroxyethyl, β-chloroethyl, γ-hydroxypropyl, cyanomethyl, β-cyanoethyl, β-carbethoxyethyl, α-carbethoxyethyl, γ-carbethoxypropyl, β-ethoxyethyl, β-methylthioethyl, γ-dimethyl-aminopropyl, N,N-dimethylcarbamoylmethyl, phenyl, chlorophenyl, tolyl, anisyl, benzyl, methylbenzyl, dimethyl-benzyl, tert. butylbenzyl, chlorobenzyl, dichlorobenzyl, fluorobenzyl, trifluoromethylbenzyl, methoxybenzyl, dimethoxybenzyl, trimethoxybenzyl, nitrobenzyl, aminobenzyl, hydroxybenzyl, β-phenethyl, β-nitrophenethyl, β-aminophenethyl, β-phenoxyethyl, γ-phenylpropyl, γ-nitrophenylpropyl, γ-phenyl-β-propenyl, γ-phenoxypropyl, N-phenyl-N-methyl-carbamoylmethyl, 2-thenyl, 2-furylmethyl, 2-(nitrofuryl)-methyl, β-piperidinoethyl, piperidinylmethyl, $N_4$-lower alkyl substituted 1-piperazinyl ethyl, piperidinocarbonyl-methyl, pyridylmethyl or β-pyridylethyl, are useful as intermediates in the production of medicaments for they can be reacted with low chloroformic acid-alkyl esters or with a chloroformic acid-phenyl ester to 3-substituted 2H-pyrido-[2,3-e]oxazine-2,4(3H)-diones of the formula

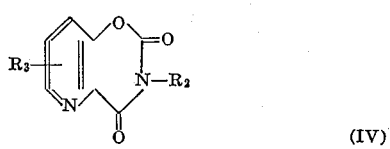

(IV)

wherein $R_3$ is hydrogen or lower alkyl having at most 3 carbon atoms, and $R_2$ has the meaning given above. The compounds of Formula IV have valuable pharmacological properties, in particular analgetic, antipyretic, antiphlogistic, muscle-relaxing and also bacteriostatic and fungistatic activity, as well as an inhibitory action on mono-amino-oxidase; furthermore, they are valuable intermediates in the production of other pharmacologically active substances and also of pest control agents.

The following can be considered as radicals $R_2$: alkyl radicals such as, e.g. methyl, ethyl, n-propyl, isopropyl, n-butyl, isobutyl, sec.butyl, amyl radicals etc. up to dodecyl radicals, alkenyl radicals such as e.g. allyl or crotyl radicals, alkinyl radicals such as e.g. the progargyl radical, cycloalkyl radicals such as e.g. cyclopentyl, cyclohexyl or cycloheptyl radicals; further, aliphatic radicals containing halogen such as e.g. β-chloroethyl, hydroxyalkyl, radicals such as, for instance β-hydroxyethyl, β-hydroxypropyl, γ-hydroxypropyl radicals, carbalkoxyalkyl radicals such as e.g. carbethoxymethyl, α- and β-carbethoxyethyl and γ-carbethoxypropyl radicals; further, alkoxyalkyl radicals such as e.g. β-methoxyethyl as well as β-ethoxyethyl radicals or the corresponding thioanalogs such as e.g. the β-methylthioethyl radical, further, cyanomethyl, β-cyanoethyl, β-aminoethyl, γ-aminopropyl, γ-dimethylaminopropyl and N,N-dimethylcarbamoyl-methyl radicals. The following types are included in the radical $R_2$, which contain an aromatic ring: phenyl or benzyl radicals which can be substituted, if desired, by 1–3 halogen atoms, low alkyl or alkoxy radicals and/or the hydroxyl, mercapto, amino, nitro or the trifluoromethyl groups, such as e.g. an o-, m- or p-chlorophenyl radical, a p-bromo-phenyl radical, a 2,4-, 3,4- or 2,5-dichlorophenyl radical, a p-nitro-phenyl radical, an o-hydroxy-phenyl radical, an o-aminophenyl radical, an o-mercapto-phenyl radical, an o-, m- or p-methylphenyl radical, an o-, m- or p-methoxyphenyl radical, a p-dimethylaminophenyl radical, an o-, m- or p-chlorobenzyl radical, a 2,4- or 3,4-dichlorobenzyl radical, a 3,5-dimethylbenzyl radical, an o-, m- or p-fluorobenzyl radical, a m-trifluoromethyl-benzyl radical, an o-, m- or p-methoxybenzyl radical, a 3,4-dimethoxy or 3,4,5-trimethoxybenzyl radical, an o-, m- or p-nitrobenzyl radical, an o-, m- or p-aminobenzyl radical, an o-, m- or p-hydroxybenzyl radical; in addition, a β-phenoxyethyl or a γ-phenoxypropyl radical; further, a β-phenylethyl or a γ-phenylpropyl radical the benzene ring of which may be substituted by nitro or amino groups, a γ-phneyl-β-propenyl radical or an N-phenyl-N-methyl-carbamoymethyl radical.

The following may be mentioned as examples of heterocyclyl and heterocyclylalkyl radicals: 2, 3- and 4-pyridyl-radicals, a 4-methyl-2-pyrimidyl-2,4-dimethyl-6-pyrimidyl, 4,6-dimethyl-2-pyrimidyl, 3-methyl-5-isoxalyl, 2-thiazolyl or 4-methyl-2-thiazolyl radical or 2-thenyl or 2-furylmethyl radicals the rings of which may also be substituted by a nitro group, respectively; further piperidinoalkyl radicals such as a β-piperidinoethyl radical, 4-substituted piperazinyl-(1)-alkyl radicals such as, for example, a β-(4-methyl-1-piperazinyl)-ethyl radicals, as well as pyridylalkyl radicals such as e.g. 2- and 4-pyridylmethyl or β-(2- and 4-pyridyl)-ethyl radicals.

$R_1$ is, for example, hydrogen, a methyl, ethyl, n-propyl, isopropyl, n-butyl, isobutyl, sec. butyl, n-amyl, isoamyl or n-hexyl radical.

When $R_1$ and $R_2$ are bound together, they form, together with the nitrogen atom to which they are linked, e.g. the 1-pyrrolidinyl, piperidino, hexamethyleneimino, morpholine, 4-methyl-1-piperazinyl, 1-indolinyl or 1,2,3,4-tetrahydro-1-quinolyl radical.

Another group of intermediates according to the invention, which fall also under the general formula of the end products obtainable by the second process step according to the invention, are those of the formula

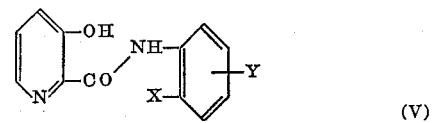

(V)

wherein X is —OH, —SH, —$NH_2$ or —NH-lower alkyl, and

Y represents chlorine, bromine, fluorine, nitro, lower alkyl or lower alkoxy. These compounds of Formula V are produced from 3-hydroxy-N-nitro-picolinamide and an amine of the formula

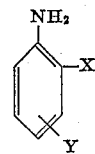

wherein X and Y have the meaning given above, under the reaction conditions described hereinbefore in the second reaction step according to the invention.

The compounds of Formula V are useful as intermediates in the production of fungistatic, tuberculostatic and analgetically-active compounds of formula

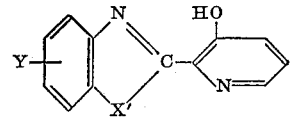

wherein X' is O, S, NH or N-lower alkyl, which result from the compounds of Formula V by dehydrolysis through heating at about 150 to 250° C. under evaporation of the water formed.

The following non-limitative examples illustrate the invention in more detail. The temperatures are given in degrees centigrade. Percentages are given by weight.

*Example 1*

150 grams (g.) of 3-hydroxy-picolinamide are added in portions to 300 milliliters (ml.) of concentrated sulfuric acid, whereby cooling prevents the temperature from rising above 20°. A mixture of 115 ml. of fuming nitric acid and 75 ml. of concentrated sulfuric acid is then added dropwise to the solution while stirring and taking care that the temperature does not exceed 25°. The reaction mixture is left to stand for a further 5 hours at about 20°, it is then poured onto ice and the precipitated yellow crystals are filtered. After washing with a large quantity of water and acetone, 3-hydroxy-N-nitro-picolinamide is obtained as a yellow substance having a melting point of ca. 206° (decomposition). Yield: 75% of the theoretical.

*Example 2*

50 g. of 3-hydroxy-picolinamide are added in portions at 10–15° to 100 ml. of concentrated sulphuric acid while stirring. After cooling to −5°, a mixture of 40 ml. of fuming nitric acid and 25 ml. of concentrated sulphuric acid is added dropwise while stirring at −5° to 0°. The reaction mixture is then stirred for a further hour at 0° and poured onto ice. The precipitated 3-hydroxy-N-nitro-picolinamide is filtered and washed first with 2 N sulphuric acid, then with water and finally with acetone. Yield: 70% of the theory.

*Example 3*

5 ml. of a 33% ethanolic methylamine solution are added to a suspension of 2.50 g. of 3-hydroxy-N-nitro-picolinamide and the whole is heated on a steam bath until the development of gaseous $N_2O$, which sets in immediately, ceases. The cooled solution is neutralised with a saturated solution of hydrogen chloride in ether and concentrated in vacuo. The residue is distributed between water and ether and the ether solution is separated, dried and concentrated. After crystallisation of the residue from isopropanol 3-hydroxy-N-methyl-picolinamide is formed in the form of colourless crystals having a melting point of 66–67°.

In an analogous manner the following amides of 3-hydroxy-picolinic acid are obtained:

N-benzyl-amide, M.P. 84° (from isopropanol);
N-cyclohexyl-amide hydrochloride, M.P. 215° (from methanol-acetone);
N-(sec. butyl)-amide hydrochloride, M.P. 131–134° (from isopropanol);
N-n-butyl-amide, B.P. $_{0.0002}$ 106–109°, M.P. below 20°;
N-ethyl-amide hydrochloride, M.P. 156–158° (from isopropanol);
N-n-propyl-amide hydrochloride, M.P. 151–154° (from isopropanol);
N-m-amyl-amide hydrochloride, M.P. 149–152° (from isopropanol);
N-isoamyl-amide, B.P. $_{0.006}$: 104°;
N-n-dodecyl-amide hydrochloride, M.P. 135° (from isopropanol);
N-allyl-amide hydrochloride, M.P. 140–143° (from isopropanol);
N-propargyl-amide, M.P. 84° (from isopropanol);
N-(β-dimethylaminoethyl) amide hydrochloride, M.P. 187–189° (from isopropanol);
N-(β-diethylaminoethyl) amide, M.P. 148–150° (from acetone);
N-(γ-dimethylaminopropyl) amide, M.P. 191–193° (from methanol-isopropanol);
N-[β-(2'-pyridyl)-ethyl] amide, M.P. 72° (from isopropanol);
N-[β-(4'-pyridyl)-ethyl] amide, M.P. 90.5–91.5° (from ethyl acetate);
N-(3,5-dimethylbenzyl) amide, M.P. 63–64° (from acetone-water);
N-(m-trifluoromethylbenzyl) amide hydrochloride, M.P. 157–161° (from isopropanol);
N-(2,4-dichlorobenzyl) amide, M.P. 107.5° (from isopropanol);
N-(3,4-dichlorobenzyl) amide, M.P. 98° (from isopropanol);
N-(3,4,5-trimethoxybenzyl) amide, M.P. 124° (from acetone);
N-(3,4-dimethoxybenzyl) amide, M.P. 86–88° (isopropanol-ether);
N-(o-chlorobenzyl) amide, M.P. 94–96° (from isopropanol);
N-(β-carbethoxyethyl) amide, B.P. $_{0.004}$ 127–129°;
N-cyanomethyl amide, M.P. 132° (from isopropanol);
N-carbethoxymethyl amide, M.P. 87.5–88° (from isopropanol);
N-(β-piperidinoethyl) amide, hydrochloride, M.P. 213–214° (from isopropanol);
N-(γ-carbethoxypropyl) amide, hydrochloride, M.P. 121–123° (from isopropanol);
N-(p-chlorobenzyl) amide, M.P. 99–100° (from isopropanol);
N-(m-fluorobenzyl) amide, M.P. 53° (from isopropanol);
N-(o-nitrobenzyl) amide, M.P. 139–140° (from dioxan);
N-(m-nitrobenzyl) amide, M.P. 117–123° (from chloroform);
N-(p-nitrobenzyl) amide, M.P. 128–129° (from acetone-isopropanol);
N-(o-methylbenzyl) amide, M.P. 76° (from isopropanol);
N-(m-methylbenzyl) amide, hydrochloride, M.P. 176–179° (from dioxan-isopropanol);
N-(p-methylbenzyl) amide, M.P. 80–81° (from isopropanol);
N-(o-methoxybenzyl) amide, M.P. 71–72° (from ether);
N-(m-methoxybenzyl) amide, hydrochloride, M.P. 161–162° (from methanol-ether);
N-(p-methoxybenzyl) amide, M.P. 94° (from isopropanol);
N-(p-tert. butylbenzyl) amide, M.P. 84° (from ethanol);
N-(β-phenylethyl) amide, M.P. 31–32° (from ethanol);
N-[β-(p-nitrophenyl)-ethyl] amide, M.P. 184–186° (from dioxan);
N-(γ-phenylpropyl) amide, hydrochloride, M.P. 141–143° (from isopropanol);
N-[γ-(p-nitrophenyl)-propyl] amide, M.P. 107–109° (from isopropanol);
N-cinnamyl amide [N-(γ-phenylallyl) amide], M.P. 77–79° (from isopropanol);
N-(γ-phenoxypropyl) amide, hydrochloride, M.P. 148–152° (from dioxan-ether);
N-furfuryl amide, M.P. 60° (from isopropanol);
N-piperidinocarbonylmethyl amide, M.P. 117° (from isopropanol-dioxan).

*Example 4*

A mixture of 5.00 g. of 3-hydroxy-N-nitro-picolinamide, 5.0 g. of aniline and 10 ml. of dimethyl formamide is heated in an oil bath until gas evolution takes place. (Reaction temperature 80–100°). After termination of the gas development, the reaction mixture is cooled, water is added and the excess aniline distilled off with steam. The crystals which precipitate after cooling are extracted with methylene chloride-ether, the organic phase is dried and concentrated. On dissolving and re-crystallising the residue from isopropanol, 3-hydroxy-N-phenyl-picolinamide is obtained in the form of crystals having a melting point of 88–89°.

In an analogous manner, the following compounds are produced, the reaction (gas evolution) occurs at the temperature indicated in brackets after each compound:

3-hydroxy-N-(p-methylphenyl) - picolinamide (75–80°), M.P. 89° (from isopropanol);
3-hydroxy-N-(m-methylphenyl) - picolinamide (75–85°), M.P. 66–68° (from isopropanol);
3-hydroxy - N - (o - methylphenyl) - picolinamide (110–120°), M.P. 90–92° (from isopropanol);
3-hydroxy - N - (m - chlorophenyl) - picolinamide (110–120°), M.P. 131° (from isopropanol); and
3-hydroxy-N-methyl-N-phenyl-picolinamide (150°), M.P. 149–151° (from isopropanol).

Example 5

A mixture of 15.0 g. of 3-hydroxy-N-nitro-picolinamide, 20.0 g. of p-anisidine and 30 ml. of dimethyl formamide is heated in an oil bath until gas evolution takes place (reaction temperature 65–75°). When the development of gas has ceased, the reaction mixture is cooled, then cooled to 0°, after addition of water, and filtered. On dissolving and recrystallising the filter residue from isopropanol, 3-hydroxy-N-(p-methoxyphenyl)-picolinamide is obtained as colourless crystals having a melting point of 108°.

3-hydroxy-N-(p-dimethylaminophenyl) - picolinamide, M.P. 109–110° (from isopropanol) is produced in the same manner, using an equimolar amount of the corresponding amine instead of anisidine.

Example 6

A mixture of 5.0 g. of 3-hydroxy-N-nitro-picolinamide, 7.5 g. of p-nitraniline and 10 ml. of dimethyl formamide is heated in an oil bath until gas evolution takes place (reaction temperature 150°). After the development of gas has ceased, the reaction mixture is cooled and water and ether are added. The precipitated crystals are filtered and washed alternately with ether and water, whereby 3-hydroxy-N-(p-nitrophenyl)-picolinamide is obtained as yellow crystals having a melting point of 252–253°.

In an analogous manner are obtained:

3-hydroxy-N-(o-chlorophenyl)-picolinamide, M.P. 118° (from isopropanol);
3-hydroxy-N-(3′,4′-dichlorophenyl) - picolinamide, M.P. 189° (from dioxan);
3-hydroxy-N-(2,4 - dichlorophenyl) - picolinamide, M.P. 188° (from chloroform-ethyl acetate);
3-hydroxy-N-(2,5 - dichlorophenyl) - picolinamide, M.P. 152° (from acetone);
3-hydroxy-N-(p-bromophenyl)-picolinamide, M.P. 150° (from isopropanol); and
3-hydroxy-N,N - dimethyl - picolinamide, M.P. 99–100° (from isopropanol).

Example 7

2.0 g. of 3-hydroxy-N-nitro-picolinamide are added to 5 ml. of piperidine and the mixture is heated on a steam bath until gas evolution ceases. It is then concentrated in vacuo, the residue is dissolved with a small amount of water, the solution is adjusted to a pH of about 4 with concentrated hydrochloric acid and cooled to 0°. The precipitated crystals are filtered, washed with a small volume of water and dissolved and recrystallised from isopropanol yielding 3-hydroxy-picolinic acid piperidide having a melting point of 162–164°.

3-hydroxy-picolinic acid morpholide with a melting point of 158° (from isopropanol) is obtained in the same manner using an equivalent amount of morpholine instead of piperidine.

Example 8

A mixture of 10.0 g. of 3-hydroxy-N-nitro-picolinamide and 10 ml. of aniline is heated in an oil bath between 60–80° until gas evolution ceases. Water is added to the reaction mixture and the excess aniline is distilled with steam. The crystals which precipitate on cooling are extracted with ether and the ether solution is dried and concentrated. The residue is dissolved and recrystallised from isopropanol yielding 3-hydroxy-N-phenyl-picolinamide; M.P. 88–89°.

Example 9

A mixture of 10.0 g. of 3-hydroxy-N-nitro-picolinamide and 20.0 g. of 2-amino-pyridine is heated in an oil bath between 130 and 140° until gas evolution ceases. After cooling and addition of water, the reaction mixture is cooled to 0° and the precipitated crystals of 3-hydroxy-N-(2′-pyridyl)-picolinamide are dissolved and recrystallized from acetone-water. M.P. 88–90°.

Example 10

A mixture of 25.0 g. of 3-hydroxy-N-nitro-picolinamide, 16.5 g. of o-phenylene diamine and 50 ml. of dimethyl formamide is heated in an oil bath until gas evolution occurs (90°) and the reaction is completed by gradually increasing the bath temperature to 130°. The red-brown solution is concentrated in vacuo, water is added to the residue which is filtered after cooling to 0°. Crystallization from isopropanol yields 3-hydroxy-N-(o-aminophenyl)-picolinamide melting at 125–128°.

In an analogous manner the following compounds are obtained. (The temperature at the beginning of the gas development and at the end of the reaction is indicated in brackets):

3-hydroxy-N - (o - hydroxyphenyl) - picolinamide (100–130°),
3-hydroxy-N-(o - mercapto - phenyl) - picolinamide (90–120°), and
3-hydroxy-N-(2′ - amino - 4′ - methylphenyl) - picolinamide (110–120°).

Example 11

14.0 g. of 3-hydroxy-N-(o-amino-phenyl)-picolinamide is heated under a stream of nitrogen at 210°–240° C. until evolution of water ceases. The resulting black residue is recrystallized from ethyl acetate furnishing 9.8 g. of 2-[2′-(3′-hydroxy-pyridyl)]-benzimidazole; M.P. 187–188°.

Example 12

In an analogous manner 2-[2′-(3′-hydroxy-pyridyl)]-benzothiazole, M.P. 150°, is obtained by cyclizing 3-hydroxy-N-(o-mercapto-phenyl)-picolinamide;

2 - [2′-(3′-hydroxy-pyridyl)]-5-chloro-benzothiazole by cyclizing 3-hydroxy - N - (2′-mercapto-5′-chloro-phenyl)-picolinamide;

2 - [2′-(3′-hydroxy-pyridyl)]-5-nitro-benzimidazole by cyclizing 3-hydroxy-N-(2′-amino-5′-nitro-phenyl)picolinamide;

2-[2′-(3′-hydroxy-pyridyl)] - 5 - methoxy-benzothiazole by cyclizing 3-hydroxy-N-(2′-mercapto-5′-methoxy-phenyl)-picolinamide;

2-[2′-(3′-hydroxy-pryidyl)]-4-methyl-benzimidazole by cyclizing 3-hydroxy-N-(2′-amino-4′-methyl-phenyl)-picolinamide; and 1-methyl-2-[2′-(3′-hydroxy-pyridyl)]-benzimidazole by cyclizing 3-hydroxy-N-(2′ - methylamino-phenyl -picolinamide; and also the analogous 5-bromo and 5-fluoro benzothiozoles, benzimidazoles and benzoxazoles by cyclization of the corresponding 3-hydroxy-N-(2′-hydroxy-, 2′-mercapto- and 2′-amino-phenyl-picolinamides which are substiuted in 5′-position at the phenyl ring by bromine or fluorine, respectively.

We claim:
1. The compound of the formula

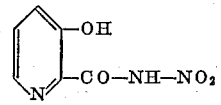

2. A process of preparing 3-hydroxy-N-nitro-picolinamide which comprises
   (a) reacting 3-hydroxy-picolinamide in an inert solvent with a mixture of fuming nitric acid and concentrated sulfuric acid at a reaction temperature below 25° C., and
   (b) isolating the said picolinamide from the reaction mixture.
3. A process as described in claim 2 wherein the solvent is concentrated sulfuric acid.
4. A process as defined in claim 2 in which the reaction temperature is in the range of from about −5° C. to about 25° C.

5. A compound of the formula
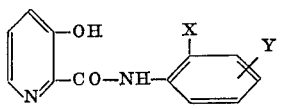
wherein:
X is a member selected from the group consisting of —OH, —SH, —NH$_2$ and —NH-lower alkyl, and Y is a member selected from the group consisting of Cl, Br, F, NO$_2$, lower alkyl and lower alkoxy.
References Cited by the Examiner
Eastwood et al.: "J. Chem. Soc." (1960), pp. 2286–92.
Habib et al.: "J. Chem. Soc." (1960), pp. 3371–83.
WALTER A. MODANCE, *Primary Examiner*.